United States Patent
Gañán-Calvo et al.

(10) Patent No.: US 6,758,067 B2
(45) Date of Patent: Jul. 6, 2004

(54) METHODS FOR PRODUCING OPTICAL FIBER BY FOCUSING HIGH VISCOSITY LIQUID

(75) Inventors: Alfonso M. Gañán-Calvo, Seville (ES); Dianna L. DeVore, San Francisco, CA (US)

(73) Assignees: Universidad de Sevilla, Seville (ES); Flow Focusing, Inc., Menlo Park, CA (US)

( * ) Notice: Subject to any disclaimer, the term of this patent is extended or adjusted under 35 U.S.C. 154(b) by 353 days.

(21) Appl. No.: 09/802,479

(22) Filed: Mar. 9, 2001

(65) Prior Publication Data

US 2001/0037663 A1 Nov. 8, 2001

Related U.S. Application Data

(60) Provisional application No. 60/188,310, filed on Mar. 10, 2000, provisional application No. 60/188,299, filed on Mar. 10, 2000, provisional application No. 60/249,665, filed on Nov. 17, 2000, and provisional application No. 60/249,848, filed on Nov. 17, 2000.

(51) Int. Cl.[7] ............................................. C03B 37/02
(52) U.S. Cl. .............................. 65/401; 65/435; 65/476
(58) Field of Search .......................... 65/401, 435, 476, 65/396

(56) References Cited

U.S. PATENT DOCUMENTS

| | | | | |
|---|---|---|---|---|
| 3,410,672 A | * | 11/1968 | De Lajarte | 65/443 |
| 3,621,531 A | * | 11/1971 | Feltgen | 425/72.2 |
| 4,101,300 A | * | 7/1978 | Imoto et al. | 65/382 |
| 4,440,556 A | | 4/1984 | Oh et al. | |
| 4,533,376 A | * | 8/1985 | Muschelknautz et al. | 65/463 |
| 4,673,427 A | * | 6/1987 | Van Der Giessen et al. | 65/424 |
| 4,846,864 A | | 7/1989 | Huey | |
| 4,925,473 A | * | 5/1990 | Jeskey et al. | 65/384 |
| 4,941,904 A | | 7/1990 | Barch et al. | |
| 4,961,695 A | * | 10/1990 | Hirschmann et al. | 425/72.2 |
| 4,988,374 A | * | 1/1991 | Harding et al. | 65/435 |
| 5,125,942 A | * | 6/1992 | Nyssen et al. | 65/506 |
| 5,173,096 A | | 12/1992 | DeLong | |
| 5,337,074 A | * | 8/1994 | Thornton | 347/237 |
| 5,545,246 A | * | 8/1996 | Lysson et al. | 65/435 |
| 5,622,671 A | | 4/1997 | Pellegrin et al. | |
| 5,637,130 A | * | 6/1997 | Nagayama et al. | 65/435 |
| 5,647,883 A | | 7/1997 | Houpt et al. | |
| 5,672,192 A | | 9/1997 | Fleming, Jr. | |
| 5,674,307 A | | 10/1997 | Huey et al. | |
| 5,698,124 A | | 12/1997 | DiMarcello et al. | |
| 5,741,384 A | | 4/1998 | Pfeiffer et al. | |
| 5,743,932 A | | 4/1998 | Houpt et al. | |
| 5,759,961 A | * | 6/1998 | Zeigler et al. | 65/507 |
| 5,770,309 A | | 6/1998 | Houpt et al. | |
| 5,776,223 A | | 7/1998 | Huang | |
| 5,895,715 A | | 4/1999 | Huang | |
| 6,053,012 A | | 4/2000 | Itoh | |
| 6,057,034 A | | 5/2000 | Yamazaki et al. | |
| 6,098,428 A | | 8/2000 | Bogdahn et al. | |
| 6,116,516 A | | 9/2000 | Ganan-Calvo | |
| 6,128,429 A | | 10/2000 | Cole et al. | |
| 6,187,214 B1 | | 2/2001 | Ganan-Calvo | |
| 6,196,525 B1 | | 3/2001 | Ganan-Calvo | |
| 6,197,835 B1 | | 3/2001 | Ganan-Calvo | |

* cited by examiner

Primary Examiner—John Hoffmann
(74) Attorney, Agent, or Firm—Karl Bozicevic; Bozicevic, Field & Francis LLP (57) ABSTRACT

The invention is directed to the production of optical fibers from optical fiber preforms using flow physics. The present methods provide for the "drawing" of an optical fiber preform using focusing of the preform by a surrounding fluid, e.g. a heated gas.

5 Claims, 4 Drawing Sheets

Nozzle geometries

METHODS FOR PRODUCING OPTICAL FIBER BY FOCUSING HIGH VISCOSITY LIQUID

CROSS-REFERENCES

This application is a continuation-in-part our earlier filed provisional patent application Ser. No. 60/188,310 filed Mar. 10, 2000; Ser. No. 60/188,299 filed on Mar. 10, 2000; Ser. No. 60/249,665 filed Nov. 17, 2000; and Ser. No. 60/249,848 filed Nov. 17, 2000 which applications are incorporated herein by reference and to which applications is claimed priority.

FIELD OF THE INVENTION

This application generally relates to the field of producing elongated strands from highly viscous liquid materials, and more particularly to the creation of optical fibers from molten glass using focused fluid technology.

BACKGROUND OF THE INVENTION

Optical fibers are thin strands of materials, such as glass or polymeric compounds, capable of transmitting an optical signal containing a large amount of information over long distances with very low loss. (See U.S. Pat. Nos. 6,128,429; 6,098,428; 6,057,034 and publications and patents cited in each of these patents) Optical communication systems based on glass optical fibers allow communication signals to be transmitted over long distances with low attention and at extremely high data rates, or band width capacity. This capability arises form the propagation of a single optical signal mode in the low loss windows of glass located at the near-infrared wavelengths. Since the introduction of erbium doped fiber amplifier (EDFA), the last decade has witnessed the emergence of the glass optical fiber as the standard data transmission medium for wide area networks (WANs).

Conventional optical fibers are typically manufactured by constructing an optical fiber preform of appropriate composition and drawing a fiber from the preform. (See U.S. Pat. No. 6,053,012 and patents and publications cited therein) A typical preform is a concentric glass rod having a length of about one meter and an outer diameter of 20–200 mm. The inner core of the rod is a high purity, low loss glass such as germanium silicate glass having a diameter of about 1–5 mm. The concentric outer cylinder, referred to as cladding, is a layer of glass with a lower index of refraction than the inner core.

In the conventional manufacture of an optical fiber, the preform is lowered into the insulated susceptor of an RF induction furnace where it is heated to a high drawing temperature. (See U.S. Pat. Nos. 5,741,384; 5,698,124 and patents and publications cited in each) A strand of glass is pulled from the heated portion of the preform at a tension and rate to draw a fiber of desired diameter. One of the primary difficulties with this conventional process is contamination of the fiber from the materials of the induction furnace. Even very small particulates from the insulation or susceptor can produce localized weak points in the fiber which will ultimately result in breakage or other forms of failure. U.S. Pat. No. 4,440,556 describes an early attempt to solve this contamination problem by directing a plasma torch axially onto a preform and drawing a fiber axially through a central passage in the torch. The difficulty with this approach is that to reach the central passage, the drawn fiber must pass through the plasma fireball. But plasma shapes are notoriously difficult to control, and even minor fluctuations in shape can subject the delicate drawn fiber to severe temperature fluctuations.

Another difficulty arises from the use of increasingly larger diameter preforms. With larger diameter preforms it is very difficult to generate a sufficiently large plasma fireball to cover the entire diameter of the preform. The result is non-uniform heating in the drawing region. Similar methods, such as the method described in U.S. Pat. No. 5,672,192, address some of the problems inherent in these methods, but still requires the use of a plasma torch and thus has many of the limitations inherent to this use.

The success of the single-mode glass optical fiber in communication backbones has given rise to the concept of optical networking. These networks serve to integrate data streams over all optical systems as communication signals make their way from WANs down to smaller local area networks (LANs) and eventually to the end user by fiber to the desktop. The increased use of optical networks, based in large part on the recent explosion of the Internet and use of the World Wide Web, has demanded vastly higher bandwidth performance in short-and medium-based applications.

There is thus a need in the art for improved methods of producing glass optical fibers to meet the growing demands of consumer use. In addition, there is a growing demand for better optical fibers, both single mode and multimode optical fibers.

SUMMARY OF THE INVENTION

The invention is directed to the production of optical fibers using flow physics. The present methods provide for the focused extrusion of a highly viscous material such as molten germanium silicate glass, either directly from a molten liquid or from a perform, using a fluid (e.g. a heated gas or liquid) that surrounds and focuses the high viscosity liquid stream or preform, resulting in an evenly shaped, elongated fiber. The invention also provides methods and devices for the manufacture of optical performs, which can then be drawn using conventional technology or using the drawing methods disclosed herein.

A flow physics methodology which is applied to low viscosity fluids is described in publications such as U.S. Pat. Nos. 6,116,516 issued Sep. 12, 2000; 6,187,214 issued Sep. 13, 2001; 6,197,835 issued Mar. 6, 2001; and 6,196,525 issued Mar. 6, 2001. However, these disclosures relate to the extrusion of low viscosity fluids. What is mean by low viscosity fluid is that the fluid has a Reynolds number which is relatively high, for example a number about 10 or more. The extrusion of low viscosity fluids is carried out under conditions using forces which are not dominated by the viscosity of the fluid but rather dominated by the mass of the fluid or its density. By analogy, the engine of car moves the car forward using the power of the engine largely to have an effect on the mass of the car and, to a lesser extent, in order to overcome the frictional resistances existing between various components. However, if the frictional forces are substantially increased such as by applying the emergency brake of the car then there frictional forces become the dominant forces which must be overcome in order to move the car forward. In this analogy the frictional forces relate to the viscosity of the fluid.

The disclosure provided here is directed towards methodology which describes creating streams and fibers from high viscosity fluids. The term "high viscosity fluid" is intended to encompass fluids wherein the Reynolds number is relatively small, specifically a Reynolds number of about 1 or less. More particularly, the Reynolds number in a very high viscosity fluid is less than about 0.1. With high viscosity fluids, as with the car with the emergency brake on, the viscosity of the fluid becomes a dominating factor in terms of what must be overcome by the forces applied in order to move the fluid forward just as the frictional resistance created by the emergency brake becomes the dominating factor which the car engine must overcome in order to move the car forward.

A section entitled "mathematical formulation" is included below. This section includes equations which will be understood by those skilled in the art upon reading this disclosure as applicable to the manufacturing of streams and fibers from high viscosity fluids such as the high viscosity fluid of molten silica glass with a high viscosity fluid of a heated glass preform used in creating fibers which are used to optically transmit information.

In a first embodiment, elongated fibers such as optical fibers are produced directly from a highly viscous liquid, e.g., molten silicate glass, by subjecting a stream of the viscous liquid to a surrounding, focusing fluid. This allows fibers to be generated without the need for producing a perform, and can also allow the extrusion of multiple fibers simultaneously. This extrusion is particularly advantageous in that the fiber stream does not contact the surface of the orifice upon extrusion of the fiber from the devices of the invention because the extruded fiber is completely surrounded by and focused with the focusing fluid which may be a gas. This makes it possible to reduce contamination of the fiber and essentially prevents clogging of the device orifice. Elongated fibers produced can have any desired diameter but are preferably 200 microns or less in diameter and may be from 1 micron to 50 microns in diameter.

In another embodiment, optical fiber preforms are reduced in diameter and increased in length using the focusing properties of a surrounding fluid. The optical fiber precursors (i.e. the preforms) are heated to a temperature that allows the preform material to maintain the basic structural elements of the preforms while allowing the preform to become ductile or specifically to be stretched to the desired length and lateral dimensions, i.e. a temperature which renders the optical fiber precursor ductile and allows the fiber to maintain the lateral relationship of the preform. The focusing process may be repeated to provide the desired diameter and/or length of the fiber, a focusing fluid and the narrowed structure can be further narrowed by repeated exposure to focusing fluid.

In another embodiment hollow fibers are produced. The hollow fibers are extruded from a source comprised of two concentrically positioned tubes. The center tube extrudes a gas such as air or a highly pure inert gas and the surrounding concentric tube extrudes molten silicate glass. The extruded silicate glass forms a hollow tube and is focused to a jet by the surrounding flow of gas in a pressure chamber. Multiple hollow fibers may be extruded simultaneously and joined together before solidifying, e.g. to form a photonic band gap structure.

An advantage of the invention is that the focusing pressure from the surrounding focusing fluid provides pressure distribution on the viscous liquid extruded or the preform and the pressure distribution can be calculated mathematically to show that it suppresses instability before any fiber drawing viscosity thereby indicating a theoretically unlimited increase in productivity.

Another advantage of the invention is that shear stress on the fiber produced from the extruded viscous material can be reduced to a minimum thereby allowing the controlled production of complex fiber structures including hollow fibers which can be combined to produce any desired configuration of photonic bandgap structures.

Yet another advantage of the invention is that gas temperature distribution along the nozzle is very rapidly transferred to the drawn fiber material thereby providing a means for a simple and accelerated control of the fiber temperature profile and offering a robust and simple manner of controlling the fiber quenching process and enhancement of fiber quality.

An advantage of the invention is that the optical fibers formed are uniform in size and shape along this length and are created with a relatively small amount of energy.

Another advantage of the invention is that it allows multiple fiber extrusions to take place simultaneously, thus allowing the fibers to be extruded as a bundle.

Yet another advantage of the invention is that the fibers can be extruded as a coated fiber using concentric needles in the devices of the invention.

Yet another advantage of the invention is that optical fibers can be created without contamination, resulting in optical fibers without localized weak points in the fiber caused by such contamination.

Yet another advantage of the invention is that fiber forming and stability using the production methods of the invention can be enhanced using an appropriate external pressure distribution.

Yet another advantage of the invention is that fiber stress can be dramatically reduced upon extrusion of the devices of the invention, as glass to solid contact is avoided due to the extrusion of the glass surrounded by the focusing gas or liquid.

Yet another advantage of the invention is that the device of the invention will have minimal contamination and/or clogging from the extrusion of the fiber, as the exit orifice never touches the fluid or perform.

Yet another advantage is that fiber quality is enhances by rapid fiber quenching owing to the coflowing gas expansion.

Yet another advantage of the invention is that complex fiber concentric structures can be formed by the dramatic reduction of radial viscous stresses of the present methods as compared to classic techniques.

Yet another advantage of the present invention is that when preforms are used they are not subject to fluctuations in shape based on the focusing procedure, and thus the drawn fibers are not subject to severe temperature fluctuations as with the use of plasma fireballs.

Yet another advantage is that the extrusion methods can be designed to create fibers with discrete functional elements based on the orientation of extrusion. This allows the production of specialized fiber structures, such as photonic bandgap structures, in conventional length fibers.

Yet another advantage is that the present methods can be used with preforms having very distinct structural elements, since the integrity of the relationship of the structural elements is maintained in the focusing procedure.

Yet another advantage is that the present methods can be used with larger diameter preforms.

These and other aspects, objects, features and advantages will become apparent to those skilled in the art upon reading this disclosure in combination with the figures provided.

BRIEF DESCRIPTION OF THE DRAWINGS

FIG. 3 includes graphs 3A, 3B and 3C wherein graph 3A shows that for a given $\lambda$ different nozzle configurations are constructed in order to provide a stable stream and fiber when extruding a high viscosity fluid wherein

DETAILED DESCRIPTION OF PREFERRED EMBODIMENTS

Before the present fiber extrusion device and method are described, it is to be understood that this invention is not limited to the particular components and steps described, as such may, of course, vary. It is also to be understood that the terminology used herein is for the purpose of describing particular embodiments only, and is not intended to be limiting, since the scope of the present invention will be limited only by the appended claims.

It must be noted that as used herein and in the appended claims, the singular forms "a", "and," and "the" include plural referents unless the context clearly dictates otherwise. Thus, for example, reference to "a dopant" includes a plurality of dopants and reference to "the fluid" includes reference to a mixture of fluids, and equivalents thereof known to those skilled in the art, and so forth.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods and materials are now described. All publications mentioned herein are incorporated herein by reference to disclose and describe the methods and/or materials in connection with which the publications are cited.

The publications discussed herein are provided solely for their disclosure prior to the filing date of the present application. Nothing herein is to be construed as an admission that the present invention is not entitled to antedate such publication by virtue of prior invention. Further, the dates of publication provided may be different from the actual publication dates which may need to be independently confirmed.

DEFINITIONS

The term "ductile" as used herein with reference to certain materials refers to materials in a phase that allows the materials to be drawn out into a strand. Ductile materials as used herein more preferably refers to materials for the creation of an optical fiber or preform that are solid at room temperature (e.g. silicate glass) but are more easily shaped or drawn into an elongated fiber at elevated temperatures. The term as used herein includes materials in a flowable, or ductile, or heated (or otherwise treated) form.

The terms "drawing" and "drawn" as used herein refer to the process of elongating a stream of material to create an elongated fiber. The drawing using flow physics results in a fiber that is consistently sized (in size and shape of cross-section along its length) and has significantly reduced lateral dimensions (cross-section) as compared to the original liquid stream or preform from which it is drawn. In a drawing process the material in the center of a solid cylinder is drawn away from the cylinder and thereby takes on a narrower diameter as compared to the cylinder. The length is increased and the diameter decreased.

The term "focusing fluid" is the fluid used to focus the liquid stream or the preform. This fluid is preferably a heated gas, although the fluid may also be a liquid (with the same or preferably low density as compared to the liquid stream being focused) that is immiscible with the liquid stream or the ductile preform.

The term "preform" as used herein refers to a structure that is a precursor to an optical fiber e.g. a solid cylinder of silica glass. A preform has the basic structural elements of an optical fiber (but has a larger diameter), and is generally heated and drawn into the narrower elongated configuration of an optical fiber. Preforms can be made of numerous different materials, as is known in the art, including glass (e.g. silicate), plastic, graphite and the like. In a preferred embodiment, the preform may be comprised of one or more photonic bandgap structures (e.g. a group of hollow cylinders) that allow light to travel through a hollow portion of the fiber that is surrounded by the photonic bandgap structure.

The term "high viscosity fluid" and "high viscosity liquid" means a flowable material which has a viscosity substantially greater than water i.e. 5 times or more the viscosity of water. Specifically, the term "high viscosity liquid" is intended to encompass fluids wherein the Reynolds number is relatively small, specifically about 1 or less and more preferably 0.1 or less. Preferred high viscosity fluids include molten silica glass and molten glass in various doped forms which are used to produce fiber in order to transmit information optically.

Device in General

Figure 1:
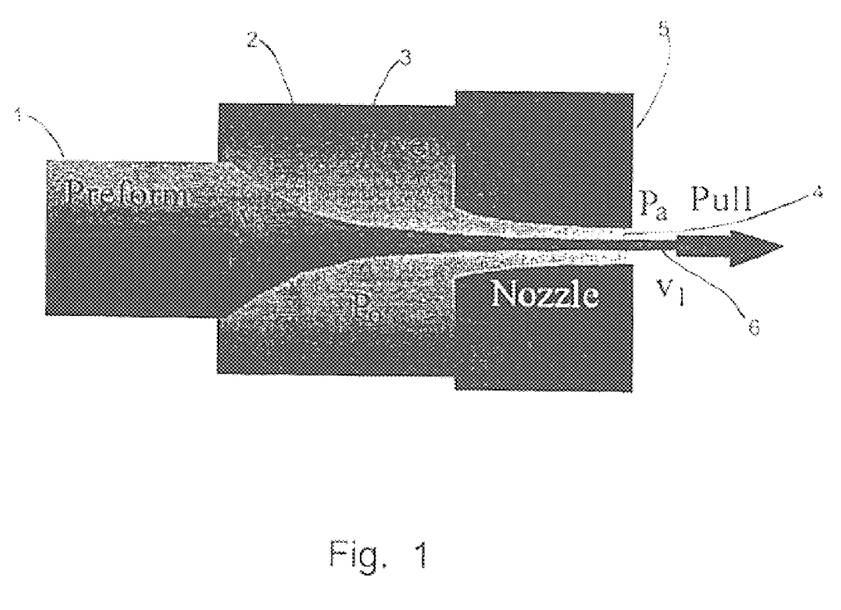
FIG. 1 is a schematic cross-sectional view of the embodiment of the present invention wherein the source material is a glass preform which is heated in an oven and extruded through a nozzle.

Referring to FIG. 1 there is shown a schematic cross-sectional view of the invention. In this particular configuration the source 1 of the high viscosity fluid is a glass preform. At least the end portion 2 of the preform 1 is included within an oven 3 or the end to the preform is heated. Further, a focusing fluid such as air or more preferably a heated inert gas is provided into the oven in order to provide a pressure $P_0$. The only exit for the focusing fluid in the pressurized oven is out of an opening 4 created via a nozzle 5. As the gas in the oven rushes out of the opening 4 through the nozzle 5 the high viscosity fluid is pulled through the nozzle 5 eventually exiting the opening 4 and creating an elongated fiber 6. This particular embodiment is a schematic embodiment and is merely provided as exemplary in order to convey the essence of the invention which is the formation of a stable fiber using a focusing fluid to draw out a high viscosity liquid. Those skilled in the art reading this disclosure will understand that variabilities will include factors such as the temperature and pressure of the oven 3, the shape of the nozzle 5, the length of the nozzle and the viscosity of the high viscosity fluid being extruded through the nozzle.

In an alternative embodiment the preform is replaced with a hollow tube which is preferably a metal tube which is continuously supplied with high viscosity fluid such as molten silica glass. Both of these embodiments, i.e. the preform embodiment and the molten liquid supplied from a tube opening have variations which make it possible to produce hollow fibers. Specifically, the preform can be a preform which is solid as is shown in FIG. 1 but also may be a preform comprised of a hollow tube which is elongated and extruded using the same methodology with the ultimate fiber extruded out of the opening 4 being a hollow fiber. When the molten silica is supplied by a cylindrical tube that tube has a second tube concentrically positioned within it which supplies a gas which is preferably a heated inert gas. A heated inert gas must be supplied at a sufficiently high pressure so that the hollow fiber is not collapsed in the oven 3. Thus, the pressure within the hollow tube is balanced so that it is substantially equal to the pressure inside the oven 3 so that the hollow tube is not collapsed but rather is extruded out of the opening 4 to form a hollow fiber. In all of the embodiments is it preferable that the pressure $P_0$ inside of the oven be sufficiently high and the configuration of the nozzle be such that the extrusion of gas out of the opening 4 is supersonic i.e. faster than the speed of sound.

Figure 2:
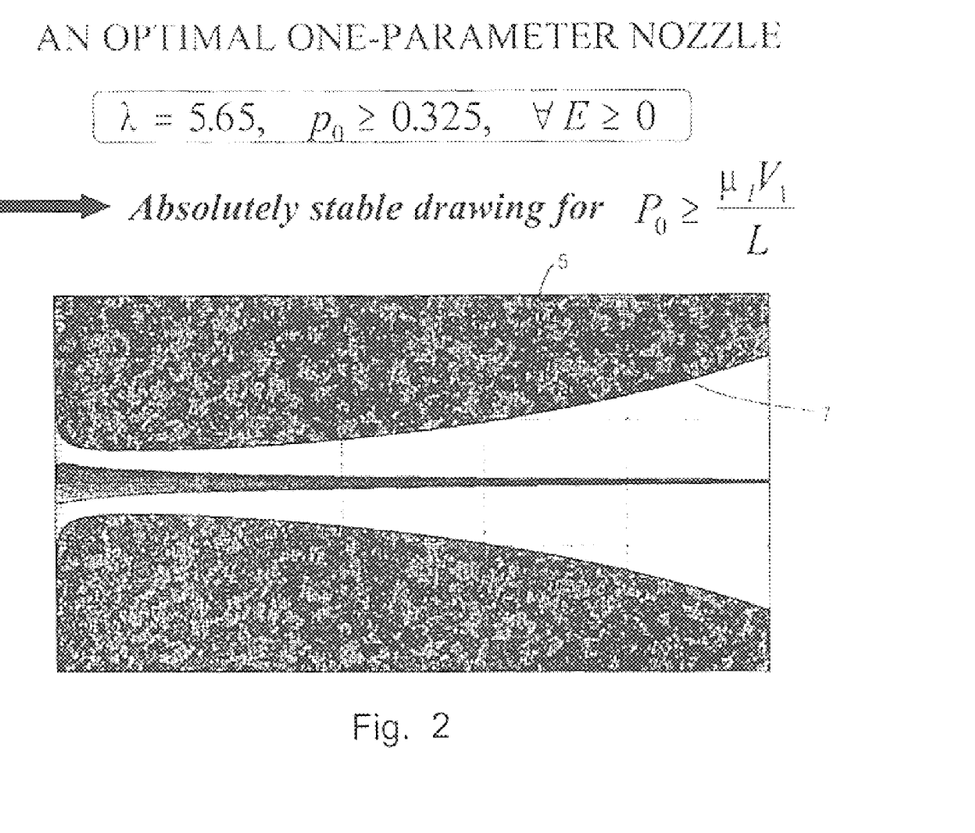
FIG. 2 is a cross-sectional view of a particular configuration of a nozzle component used in the production of streams and fibers from high viscosity fluids in accordance with the present invention.

Referring now to FIG. 2 there is shown a schematic cross-sectional view of a nozzle of the invention. The particular configuration of the nozzle is important in order to obtain desired results which particularly include the extrusion of the fiber in a stable manner out of the opening 4 so that the fiber does not flap or move excessively resulting in breakage or non-uniformity of the fiber material being extruded. The geometry of the internal surface 7 of the nozzle 5 can be determined by the following formula:

$$P(x) = p_0 e^{-\alpha}$$

$P_0$ is the internal pressure inside the oven 3; $\lambda$ is a constant wherein $\lambda$ is greater than 0.635 in order to obtain supersonic expansion and x is a function.

As indicated in FIG. 2, for the shown configuration $\lambda$ is 5.65; $P_0$ is greater than or equal to 0.325 for all E greater than or equal to 0. Such will result in absolute stability for drawing of a high viscosity fluid in accordance with the following equation:

$$P_0 \geq \frac{\mu_l V_1}{L}$$

In the above formula $\mu_l$ is the viscosity of the high viscosity liquid; $V_1$ is the velocity of the fiber inside of the nozzle which is substantially greater than the velocity $V_0$ of the fiber as it extrudes off of the end of the preform or out of the tube; and L is the length of the nozzle and therefore the length over which the focusing fluid such as the gas provides substantial energy to the fiber pulling, forcing or drawing it forward out of the opening 4.

Figure 3A:
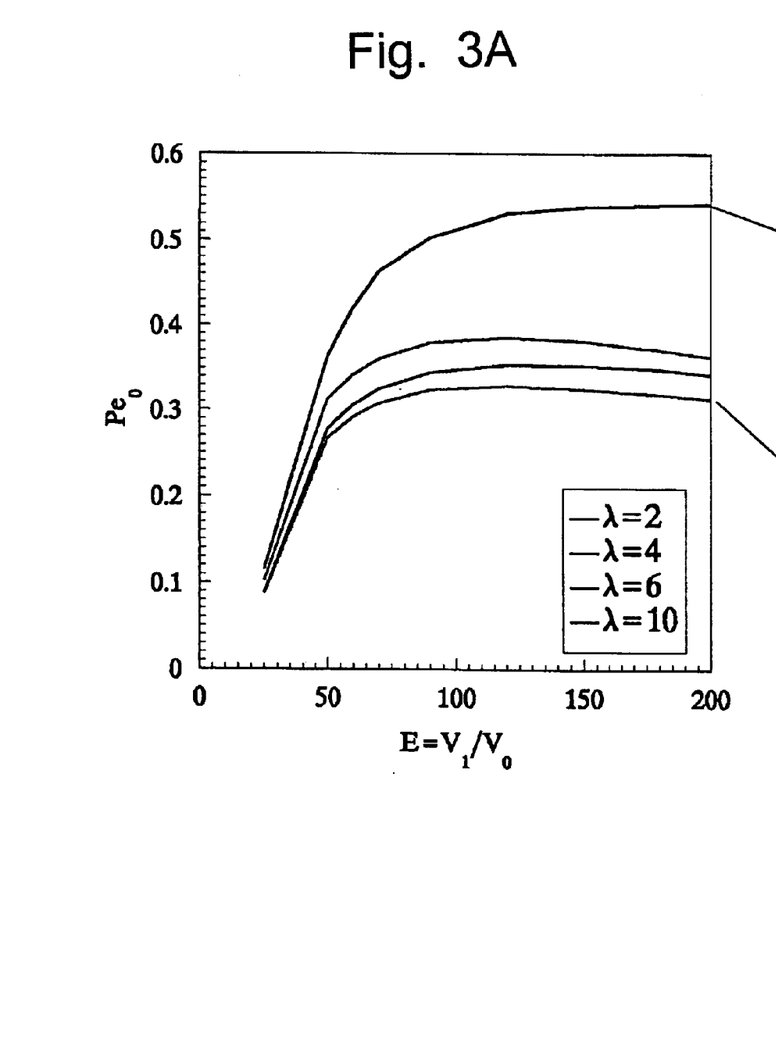
Figure 3B:
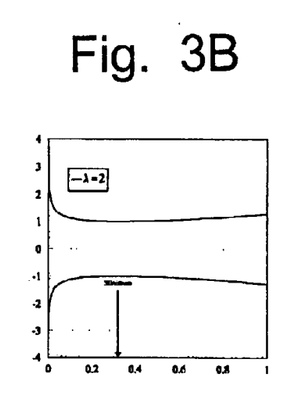
FIG. 3B shows a nozzle configuration where $\lambda=2$ and FIG. 3C shows the nozzle configuration when $\lambda=6$.
Figure 3C:
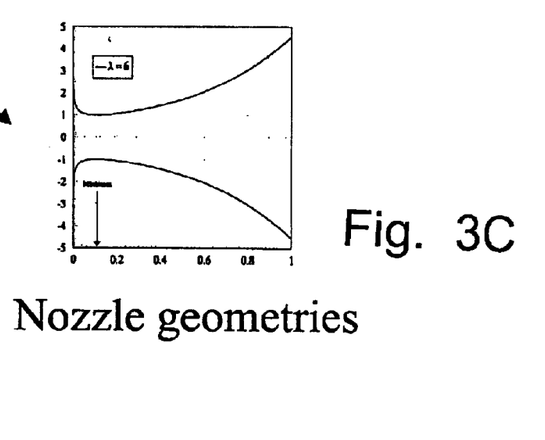

Referring now to FIG. 3 which includes graphs 3A, 3B and 3C it can be seen that different $\lambda$ provide different nozzle configurations which can result in absolute stability of the fiber drawn out of the opening 4 of the nozzle. Specifically, within FIG. 3A plots are drawn for $\lambda=2$, 4, 6 and 10. Within FIG. 3B the nozzle configuration is shown for $\lambda=2$ and within FIG. 3C a nozzle configuration is shown for $\lambda=6$.

Figure 4:
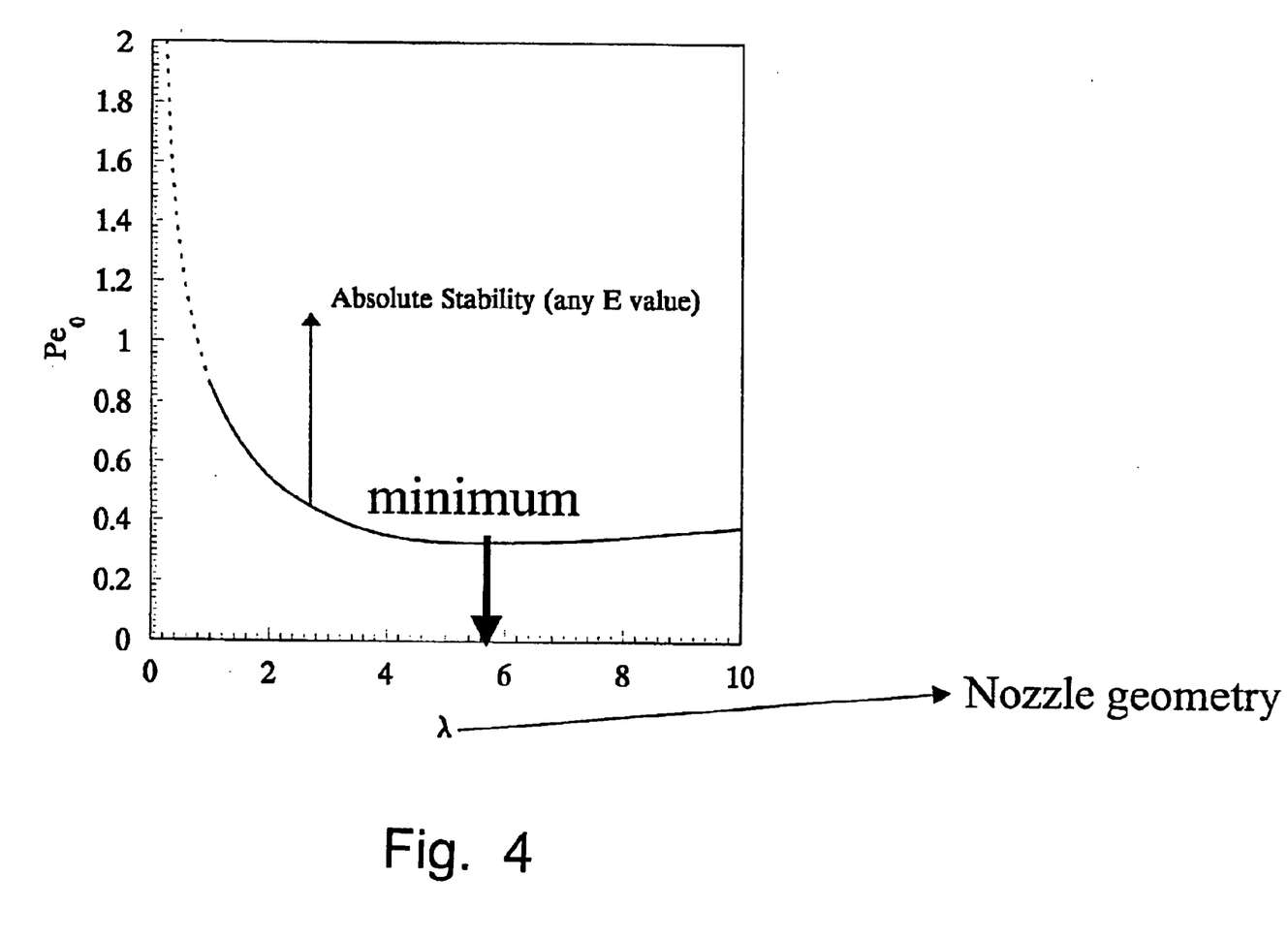
FIG. 4 is a graph which shows the pressure needed in order to obtain a stable jet with different nozzle configurations based on different $\lambda$ values.

Referring now to FIG. 4 an additional parameter which is the pressure is taken into consideration. For a given X which is plotted on the X axis the graph in FIG. 4 shows the amount of pressure at the entrance to the oven which is needed in order to obtain a stable jet.

Forces Exerted for High Viscous Fluids

A model for the production of a glass fiber takes into account a number of different parameters. The parameter window used (i.e. the set of special values for the properties such as flow-rate used, feeding needle diameter, orifice diameter, pressure ratio, etc.) should be large enough to be compatible with virtually any desired viscous liquid or preform (dynamic viscosities in the range from $10^{-4}$ to 1 kg $m^{-1}s^{-1}$).

When the preform-fluid interface is created, the preform that emerges from the outlet of the feeding point is concentrically withdrawn into the nozzle. After the preform emerges from the exit port, it is accelerated by tangential sweeping forces exerted by the focusing fluid (e.g. gas stream) flowing on its surface, which gradually decreases the preform cross-section dimensions. Stated differently the gas flow acts as a lens and focuses the preform as it moves toward and into the exit orifice of the pressure chamber. This is schematically shown in FIG. 1.

The forces exerted by the fluid flow on the preform surface should be steady enough to prevent irregular surface oscillations. Therefore, any turbulence in the gas motion should be avoided; even if the gas velocity is high, the characteristic size of the orifice should ensure that the gas motion is laminar (similar to the boundary layers formed on the jet and on the inner surface of the nozzle or hole).

One of the advantages of the invention is that a desired cooling effect can be obtained on the surface of the fiber 6 as it exits the opening 4 of the nozzle 5. Specifically, as the gas exits the opening 4 of the nozzle the gas rapidly expands making it possible to absorb energy or the heat on the surface of the fiber 6. This makes it possible to quickly cool the fiber which fiber may be at a substantially molten state when exiting the opening 4. The cooled fiber is then solidified and can be moved into storage. As shown in FIG. 1 the oven is pressurized with a pressure $P_0$ and has a single nozzle with a single opening 4. However, the invention contemplates an embodiment where the oven or pressurized area includes multiple nozzles 5 with multiple openings 4 each being supplied by a different high viscosity supply source which are each positioned upstream of the opening 4 in each of the nozzles 5. In such a configuration only a single oven or heating element may be required. Further, because the gas or pressure within the oven or pressure chamber is sufficient to focus and move the fiber through the nozzle precise positioning of the nozzle is not crucial provided the nozzle and its opening to the outer atmosphere is positioned substantially downstream of the flow of the high viscosity fluid.

Using the embodiment as shown in FIG. 1 it is possible to provide a coated fiber by including a coating a material inside the oven 3. Any desired coating or cladding material could be included within the gas or other focusing fluid material provided to the high viscosity fluid. Still further, in the embodiment where the high viscosity fluid is provided to the oven by a tube and that tube encompasses a concentrically positioned tube which extrudes a gas that gas can include a coating or cladding material which can be used to coat or clad the inside of the fiber being created. Those skilled in the art will contemplate a range of different materials which are desirably coated onto the inside and/or outside of the fiber in order to provide desired optical characteristics or other characteristics to the fiber being produced.

Optical Fiber Preforms

Optical fibers are typically manufactured by constructing an optical fiber preform of appropriate composition and drawing a fiber from the preform. The preform is constructed and then subjected to a high temperature drawing procedure where the center of the solid preform is pulled away thereby increasing the length of the fiber while simultaneously decreasing the lateral dimensions of the fiber. A typical preform is a concentric glass rod having a length of about one meter and an outer diameter of 20–200 mm. The inner core of the rod is a high purity, low loss glass having a diameter of about 1–5 mm, and the glass is optionally doped for increased optical performance. The concentric outer cylinder, referred to as cladding, is a layer of glass with a lower index of refraction than the inner core.

In one particular embodiment, the present invention can be used to construct elements (tubes and rods) for the construction of optical fibers and/or optical fiber preforms. The present invention can be used to form single rods having an inner core and an outer cladding core. The core, for example may comprises silica doped with oxides of germanium or phosphorous or, alternatively, the fibers may comprise a polymer-clad silica glass core. The cladding can be a pure or doped silicate such as fluorosilicate, an organosiloxane such as polydimethylsiloxane or a fluorinated acrylic polymer. See e.g., U.S. Pat. No. 6,014,488. The fibers may also contain a third, outer coating, e.g. a coating with a resin containing a pigment to allow color coating of a fiber.

The two layers (or more) layers of the rod are extruded as cylindrical tubes through concentric needles, and are preferably focused by a heated gas, e.g. heated air or heated inert gas. The rods are extruded into an environment that allows the solidification of the rods prior to destabilization of the stable microjet. The fibers that are produced can be used directly or drawn into a longer, thinner fiber depending on the desired length and bandwidth of the optical fiber. Thus, the focusing technology can produced a long, thin optical fiber for direct use in a cable or, preferably, the produced fiber can be further drawn before use in an optical cable.

In a particularly preferred embodiment, the methods of the present invention are used to construct preforms for optical fibers based on photonic bandgap structures. A photonic crystal is a structure that repeats a structural element in one or more dimensions in space. As a result of multiple reflections, certain wavelengths cannot propagate in these structures, and the structure is said to possess a 'photonic band gap' if it reflects a wavelength incident from any angle in space. Joannopoulos, J. D. et. al., Photonic crystals: molding the flow of light, Princeton University Press, (1995); Cassagne D. et. al. Phys. Rev. B 52: R2216–R2220 (1995).

Initially, it was thought that a large contrast in refractive index would be needed to achieve a photonic band gap. An example of such a contrast would be the refractive index between air and semiconductor, i.e. a refractive index, n, greater than 3. Studies have now shown that it is possible to create a two-dimensional photonic band gap using a modest contrast in that refractive index between air and silica (n=1.5), providing the light has a component traveling parallel to the direction of the rods. Binks et. al., Electron. Lett. 31, 1941–1943 (1995). Wavelengths that are normally absorbed by silica can be transmitted for much longer distances through air, and because air is not susceptible to the nonlinear effects that occur in silica at moderate optical powers, much higher powers can be delivered using a photonic bandgap structure. Photonic band gap structures thus offer the ability to design new optical properties into conventional materials by wavelength scale periodic microstructuring of the material morphology.

Optical fiber preforms of this type are generally constructed using multiple rods and/or tubes which are stacked to produce a desired structure. See e.g., Cregan et al., Science 285:1537–1539 (1999) and Knight et al., Science 285:1476–1478. Such tubes can be formed from any material that allows the creation of the photonic bandgap structure, including but not limited to silica, glass, graphite, plastic and the like. See Cregan et al., supra, and F. Gadot et al., Appl. Phys. Lett. 71:1780 (1997). The structure is based on a defect in an otherwise periodic array of air holes placed within a honeycomb lattice.

For example, a number of solid silica rods of a constant diameter can be stacked horizontally to create a structure with a polyagonal cross-sectional structure. To create a waveguiding core within the structure, a "defect" must be introduced into the crystal structure, i.e. a localized region with optical properties different from those of the fully periodic structure. This core is surrounded by a "cladding", in this case the fully periodic region, which confines the light within the core. Preferably, a larger space is left in the center of the preform to allow light to be guided down the central core. The introduction of extra air holes into the structure also can allow localized guided modes to appear within a band gap.

Photonic Bandgap Structures

There are two principle ways to reflect light at optical frequencies, total internal reflection (TIR) and reflection from a periodic dielectric structure. TIR occurs at the interface between two dielectrics when it is not possible to simultaneously match both the frequency and the phase on both sides of the interface. When light is incident from the high dielectric material, it is totally reflected back into the material. This only occurs if the angle of incidence is greater than the critical angle. Light can also be reflected at the interface between a homogeneous dielectric and a periodic dielectric. This occurs when multiple scattered waves in the periodic medium destructively interfere, thereby prohibiting propagation inside the periodic medium.

The interaction of light with glass now limits the maximum power that one can transmit with conventional glass optic fibers, which rely on TIR. Since no solid material has an index of refraction of less than one, it is not possible to have hollow cores with fibers that rely on TIR because the core must have a larger index of refraction than the cladding.

A photonic crystal is a structure that repeats a structural element in one or more dimensions in space. As a result of multiple reflections, certain wavelengths cannot propagate in these structures, and the structure is said to possess a 'photonic band gap' (PBG) if it reflects a wavelength incident from any angle in space. Joannopoulos, J. D. et. al., Photonic crystals: molding the flow of light, Princeton University Press, (1995); Cassagne D. et. al. Phys. Rev. B 52: R2216–R2220 (1995). Structures having such photonic crystals, and thus possessing PBGs, can be used as optical fibers since they have the ability to direct light through hollow portions of the structure that are enclosed by material possessing an appropriate photonic bandgap.

In one embodiment, the methods of the invention can be used to produced optical fibers composed of PBG structures. As mentioned above, these structures allow propagation of light through a hollow core without certain limitations found in fibers utilizing TIR, e.g. the requirement for a higher index of refraction of the cladding. The use of air as the medium though which light travels also prevents the absorption of certain wavelengths that are absorbed by core materials (e.g., glass) of conventional optical fibers. It is possible using the methods of the present invention to make PBG structures which allow single mode transmission of light along a hollow structure in a fiber.

Initially, it was thought that a large contrast in refractive index would be needed to achieve a photonic band gap. An example of such a contrast would be the refractive index between air and semiconductor, i.e. a refractive index, n, greater than 3. Studies have now shown that it is possible to create a two-dimensional photonic band gap using a modest contrast in that refractive index between air and silica (n=1.5), providing the light has a component traveling parallel to the direction of the rods. Binks et. al., Electron. Lett. 31, 1941–1943 (1995). Wavelengths that are normally absorbed by silica can be transmitted for much longer distances through air, and because air is not susceptible to the nonlinear effects that occur in silica at moderate optical powers, much higher powers can be delivered using a photonic bandgap structure. Photonic band gap structures thus offer the ability to design new optical properties into conventional materials by wavelength scale periodic microstructuring of the material morphology.

Construction of the Optical Fiber Preform

A variety of optical fibers are known, and each of these fibers can be produced from a specific preform. In a preferred embodiment of the present invention, the optical fiber preforms are composed of photonic crystals containing periodic regions that create PBGs. Optical fiber preforms of this type are generally constructed using multiple rods and/or tubes which are stacked to produce a desired structure. See e.g., Cregan et al., *Science* 285:1537–1539 (1999) and Knight et al., *Science* 285:1476–1478 (1998). Such tubes can be formed from any material that allows the creation of the photonic bandgap structure, including but not limited to silica, glass, graphite, plastic and the like. See Cregan et al., supra, and F. Gadot et al., Appl. Phys. Lett. 71:1780 (1997). The structure is based on a defect in an otherwise periodic array of air holes placed within a honeycomb lattice.

For example, a number of solid silica rods of a constant diameter can be stacked horizontally to create a structure with a polyagonal cross-sectional structure. To create a waveguiding core within the structure, a "defect" (or hollow section) must be introduced to achieve optical properties different from those of the fully periodic structure. This core is surrounded by a fully periodic region, which acts as a "cladding" and confines the light within the core. Preferably, a space is left in the center of the preform to allow light to be guided down the central core. Alternatively, multiple hollow spaces may be left within the periodic structure to allow light to travel down multiple channels. The introduction of extra air holes into the structure also can allow localized guided modes to appear within a band gap.

In another example, a exemplary single mode optical fiber consists of a core of 10 µm diameter in the center, a cladding of 125 µm diameter surrounding the core, and a protective jacket formed by resin covering the cladding. The optical fiber glass preform is consequently also comprised of an inner core portion and a cladding coating. This optical fiber glass preform itself is conventionally formed by converting a soot body for forming the optical fiber porous glass preform into transparent glass.

Conventional methods of producing optical fiber porous glass preforms include the OVD method (outer deposition type CVD method) and the VAD method. Preforms for use with the present invention can be produced using these or other methods of creating preforms that are known to those skilled in the art.

For example, the general method of production of an optical fiber porous glass preform using the VAD method involves preparing a seed bar (hereinafter referred to as a "target bar") and placing the target bar inside a reaction container, a reaction chamber with one end suspended from an upper side so that the target bar can be rotated around its longitudinal center axis. Oxygen, hydrogen, and other combustion gases and the $SiCl_4$ glass particle material (including a dopant such as $GeCl_4$ if desired) are fed to oxyhydrogen burners from which oxyhydrogen flames are generated. In the oxyhydrogen flames formed by the combustion gases from the burners, the moisture in the oxyhydrogen flames and the $SiCl_4$ undergo a hydrolysis reaction as shown by the following reaction formula and form $SiO_2$, which is the main component of the glass particles:

$$SiCl_4 + 2H_2O = SiO_2 + 4HCl$$

These glass particles are sprayed to the lower part of the rotating target bar and deposited thereon to form the optical fiber soot body.

The optical fiber soot body formed by the VAD method is then converted to transparent glass to form the optical fiber porous glass preform used for producing an optical fiber. Note that an optical fiber soot body converted to transparent glass can further have glass particles deposited around it, if necessary. In this case, after depositing the glass particles, the soot body is again converted to transparent glass to form the optical fiber glass preform.

Other methods for creating conventional optical fiber preforms are described in U.S. Pat. Nos.: 4,224,046; 4,419,116; 4,421,540; 5,320,660; 5,397,372; 5,672,192.

Coating the Optical Fibers

Optical fiber cables containing a plurality of optical fibers for the transmission of optical signals are well known. Such optical fiber cables typically include a core which may have a strength member to carry the axial tensile stress and axial compressive forces on the cable. Also located within the core are one or more tubes. Each tube typically includes a plurality of optical fibers. The optical fibers within a tube may be individually stranded or may be provided in an optical fiber ribbon. A sheath is provided to enclose the core including the tubes and the strength member. The optical fibers included within such a cable typically include a glass core and one or more claddings and/or coatings.

During a process of manufacturing a glass optical fiber, a glass fiber is drawn from a preform and then coated with one or more coating materials, typically ultra-violet light curable materials. The coating materials include, for example, polymeric compositions and are applied by one or more coating applicators. The function of the fiber coating is to protect the surface of the glass optical fiber from mechanical scratches and abrasions which the optical fiber may experience during subsequent handling and use. The coating or coatings also influence the fiber's optical characteristics in response to external mechanical forces and environmental temperature.

Optical fibers are almost universally color-coded in their end use. There are numerous colors which are acceptable in most markets, with additional identification being made possible by "banding" colored fibers with additional colors or circumferential striping. One well-known method of coloring an optical fiber is to apply an ink layer to an optical fiber having single or dual coating layers so that the total composite optical fiber includes primary and secondary coating layers with an outermost ink layer. The ink coloring layer is thin, typically 3 to 5 microns in thickness, and typically includes a carrier resin and a pigment system. The carrier resin may typically be a soluble thermoplastic material or a ultra-violet (UV) curable resin. In the former, the ink is applied via a dye or a transfer method, such as a felt-tip applicator or roller, and the solvent for the carrier resin is driven off by heat to leave the pigmented resin on the fiber. In the UV system, there is no solvent. The liquid resin pigment is cured to a solid state by UV energy. Either ink involves a separate step from either optical fiber production or the cabling operation.

An alternative method for color-coding the fiber is to have the color mixed directly into a secondary (outer) coating of a dual coated optical fiber. The secondary coating acts as the carrier resin for the coloring agents.

In one embodiment, the optical fibers are coated during the focusing procedure using the desired liquid coating as the surrounding, focusing fluid. For example, a preform can be heated and focused using an outside liquid composed of a liquid resin pigment. As the preform is focused, it is also coated by the liquid resin and pigment, and upon expulsion of the focused optical cable it would retain an outer coating of the focusing material. The focused optical fiber is then expelled into a gaseous environment and immediately cured to a solid state using UV energy.

Preform and Fiber Characteristics

The methodology of the present invention can be used to produce both preforms which can then be used via conventional drawing technology to produce fibers or, alternatively, can be used to produce fibers from preforms produced using conventional technology or alternatively the present invention can be used to produce fibers using preforms produced according to the methodology described herein. Preforms which have a constant diameter along their length can be produced using the technology described herein particularly wherein the diameter varies along the length of the fiber or preform from ±1% or less to as much as ±30% or less. Further, fibers can be produced wherein the diameter along the length of the fiber is substantially constant for example an optical fiber of silica glass can be produced having a diameter of about 1 micron wherein the diameter along the length of the fiber varies ± about 10% or less or more preferably ± about 1% or less.

The methodology of the present invention provides fiber forming stability which may be enhanced by the appropriate external pressure distribution provided inside of the oven or pressure chamber. The stress on the fiber may be dramatically reduced since the glass-to-solid contact is avoided by the surrounding focusing fluid or gas shroud. Complex fiber concentric structures may be formed by the dramatic reduction of the radial viscous stresses compared to the classical extrusion or drawing technology. Molten or semi-molten/semi-solid fibers extruded from the nozzle of the invention can be combined together to provide phonic bandgap structures of any desired configuration. Not only are the characteristics of such photonic bandgap structures and fibers produced via the present technology desirable but the processing itself results in desirable characteristics such as avoiding clogging of the extrusion device due to the surrounding focusing fluid and avoiding contamination of the fiber material due to contact with such solid objects. Still further, the fiber quality may be enhanced by the rapid fiber quenching which occurs due to the expansion of the gas exiting the nozzle.

EXAMPLES

The following examples are put forth so as to provide those of ordinary skill in the art with a complete disclosure and description of how to make and use the present invention, and are not intended to limit the scope of what the inventors regard as their invention nor are they intended to represent that the experiments below are all or the only experiments performed. Efforts have been made to ensure accuracy with respect to numbers used (e.g. amounts, temperature, etc.) but some experimental errors and deviations should be accounted for. Unless indicated otherwise, parts are parts by weight, molecular weight is weight average molecular weight, temperature is in degrees Centigrade, and pressure is at or near atmospheric. Units of pressure described herein are assumed to be Pascals units and viscosity is in kilograms per meter per second, length as in meters and velocity is in meters per second.

Example 1

Focusing of a Conventional Optical Fiber Preform

Optical fibers are typically manufactured by constructing an optical fiber preform of appropriate composition and drawing fiber from the preform. A preform is a concentric glass rod having a length of about one meter and an outer diameter of 20 mm. The inner core of the rod is a high purity, low loss glass such as germanium silicate glass having a diameter of about 3 mm. The concentric outer cylinder, referred to as cladding, is a layer of glass with a lower index of refraction than the inner core.

Drawing of this preform is performed using a device as illustrated in FIG. 1. Briefly, the end of the preform serves as a delivery source which is heated to a temperature that allows the preform material to become ductile. In general, high viscosity liquid fibers like the silica require working in the temperature range 700–1000° C. (about 1000 to 1300° K.), with viscosities ranging from 1,000,000 to 1,000,000,000 cpoises. The preform is kept in the heated environment for a sufficient time to become ductile, and then is introduced from the preform delivery source into the pressure chamber or oven with the surrounding focusing gas. The preform is introduced into the pressure chamber by opening the preform delivery source using the force of gravity and optionally a pulse of heated gas into the delivery source chamber. The focusing gas is introduced into the pressure chamber via a second entry port. The focusing gas may also be heated to maintain the ductility of the preform.

The focusing fluid or gas within the oven 3 rushes towards the exit 4 of the nozzle 5 creating a pull on the highly viscous glass of the preform and tube. Thus, the cylindrical structure of the preform is increased in length and decreased in a cross-sectional dimension as it moves toward the nozzle 5. Within the nozzle 5 additional forces are continually applied along the length "L" of the nozzle until it exits the opening 4 of the nozzle 5 and is cooled by the rapid expansion of the gas also exiting the opening 4 into the atmospheric pressure $P_a$. When the fiber 7 exits the opening 4 of the nozzle 5 it is moving at a velocity "$V_1$" which is substantially faster than the velocity "$V_0$" which it is moving at when it is at the end 2 of the preform 1. Further, the gas is expanding supersonically for $\lambda > 0.635$.

In accordance with the invention it is possible to repeatedly apply the methodology as shown within FIG. 1. Specifically, the fiber 6 exiting the opening 4 could be the beginning of the same processing steps whereby that length of viscous material enters and oven 3' and enters a nozzle 5' in order to be further stretched, i.e. increased in its longitudinal dimension and decreased in its cross-sectional dimension so as to produce a fiber of any desired length or dimension.

Because of the different physical phenomenon and the scaling laws for high viscosity liquids, the nozzle is preferably designed to undergo the extremely high pressures needed to draw the fiber 6 by the gas jet through the 200 microns nozzle. For example, certain fluids may exhibit a violent flapping or 'whipping' instability upon exiting the chamber. This can be accounted for in the design of the device and in the manner in which the flow is expelled. For example, the flow and the fiber can discharge into a vacuum chamber so that the fiber 6 will flash-cool and will undergo a favorable pressure gradient along the vacuum chamber.

Example 2

Focusing of a Photonic Bandgap Optical Fiber Preform

An optical fiber composed of one or more photonic bandgap structures can be drawn using the method and devices of the present invention.

Optical fibers based on photonic bandgap structures have been recently described in the art. These structures have a photonic bandgap structure as the cladding, which forces light to remain in the hollow core. The structure is constructed from silica tubes and rods, as the contrast between silica and air (1.46 to 1) has been shown to be sufficient to produce a bandgap useful for these purposes. Cregan et al., supra and Knight et al., supra. The bandgap created depends upon the geometrical arrangement of the preform, and altering structural aspects such as the holes, the size of the holes and the distances between the holes will also alter the bandgap created. The PBG structure for use as an optical fiber is preferably a structure with a larger volume of air in the center, e.g. from about 25–45%, and preferably around 30%.

All fibers can be produced using two basic different methods. In accordance with the preform 1 (as shown within FIG. 1) may be a hollow cylinder. In accordance with an alternative configuration the molten silica glass is provided by a tube which extrudes molten silica and which tube is concentrically positioned around a second tube which simultaneously extrudes a gas and maintains the gas at a pressure which is substantially the same as the pressure "$P_0$" within the oven or pressure chamber 3. It is possible to align a plurality of components such as shown in FIG. 1 so that they simultaneously extrude hollow semi-solid tubes which come into contact with each other while still in a semi-solid state. The tubes can then be made to fuse to each other and form a photonic bandgap structure when the different tubes are correctly positioned in a manner known to those skilled in the art.

Example 3

Focusing of Elements of a Photonic Bandgap Optical Fiber Preform

In addition to or in combination with the focusing of Example 2, precursor elements of the optical fiber PBG preform can be focused prior to construction and/or fusion of the preform. The PBG preform are constructed using rods and/or tubes that are bundled to create certain even spacing of holes within the structure.

Hollow silica or plastic rods are provided, and then modified using the focusing methods of the present invention. These tubes can be focused to a very specific and small diameter using the methods of the present invention, and the focused tubes can be used to produce an optical fiber preform composed of such tubes. The liquid flow is then focused into a microjet by a gaseous outer fluid, and the tubes are expelled into a gaseous environment where they solidify and are collected.

To construct the preform, several hundred of the hollow, focused tubes are bundled into a hexagonal array. The diameter of the tubes used to construct the preform depend upon the desired size of the holes in the bandgap, as will be apparent to one skilled in the art upon reading the present disclosure. The diameter of the tubes will control the spaces between the tubes and the resulting periodic space in the optical fiber made from the preform. Once the tubes have been stacked, an appropriate number of tubes (e.g., 5–50 tubes) are removed to provide one or more hollow cores through which light can travel.

Following construction, the preform can be fused and prepared to be drawn into a fiver. Alternatively, the unfused preform can be subjected to an elongation event such has that described in Example 1, and fuse either during following said event.

Mathematical Formulation

We consider a Newtonian viscous liquid concentrically drawn through a convergent-divergent micro-nozzle with length L, and surrounded by a high speed gas stream as sketched in FIG. 1, assuming an axisymmetric configuration (the effect of asymmetries is described below). The object is to obtain a fiber of final radius $\alpha \ll L$ at a given velocity $V_1$. We define non-dimensional variables x, f, v, and p standing for the axial coordinate, fiber radius, liquid velocity, and liquid pressure, which are made dimensionless with L, $\alpha$, $V_1$, and $3\mu_o V_1/L$, where $\mu_o$ is a reference liquid viscosity. Furthermore, owing to the disparity in the residence times of particles of the liquid and the gas, the gas can be considered steady for any non-steady liquid motion of interest (including motions with wavelengths of the order of the fiber diameter). The gas pressure and temperature can be considered as steady variables in the problem, which are functions of the axial coordinate only.

For the sake of generality, we can assume a non-linear dependence of the liquid viscosity with temperature $\mu=\mu(T_1)$, where $T_1$ is the liquid temperature. Using viscous liquids at temperatures around a "drawing" point given by $T_o$ for which the liquid viscosity is $\mu_o$ ($\mu_o=10^5$ Pa·s in many practical situations), the relationship between viscosity and temperature is well fitted by the law $\mu=\mu_o 10^{-\kappa(T_1/T_o-1)}$, where $\kappa$ is a non-dimensional constant (in the case of common glasses used in fiber optics, we have $T_o\sim 1000K$ and $\kappa$ about 10 to 15). One can then define a non-dimensional viscosity $\zeta=\mu/\mu_o$. Thus, neglecting gravity forces, liquid acceleration and surface tension forces compared to the much larger viscous and pressure forces, one can write the well known mass and momentum conservation equations for the liquid as:

$$f^2 + \partial_x(f^2 v)=0; \quad \partial_x p = \partial_x(\zeta f^2 \partial_x v)/f^2 + f_s \quad (1)$$

with boundary conditions (i) $p=p_o=(LP_o)/(3\mu V_1)$, $f=E^{1/2}$, and $v=E^{-1}$ at $x=0$, and (ii) $v=1$ at $x=1$, where $E=V_o/V_1$, $V_o$ is the intake liquid velocity (or the glass preform velocity in glass fiber drawing). $f_s=F_s/(3\mu V^1/L^2)$, where $F_s\sim \tau/\alpha$ is the axial resultant per unit volume owing to the viscous stress on the surface, and $\tau$ is the viscous stress on the liquid surface owing to the gas stream. Assuming a high viscosity liquid, the fiber radial velocity profile is almost perfectly flat since the viscous diffusion time $t_v\sim \rho\alpha^2\mu^{-1}$ is many orders of magnitude smaller than the hydrodynamic time $t_o\sim LV_1^{-1}$ (i.e., $\mu L(\rho V_1 \alpha^2)^{-1} \ll 1$).

On the other hand, the gas flow is governed by the well known isentropic compressible 1-D, N-S equations: the gas pressure and temperature distribution are given by their stagnant values $P_o$ and $T_o$, respectively, and the nozzle geometry through $A(x)$, its local cross section area. The gas expansion in the nozzle provokes a change in the gas temperature along the nozzle which is given by $$T/T_o = 1 - \Delta T/T_o = (1 - \Delta P/P_o)^{(\gamma-1)/\gamma} \quad (2)$$

in the isentropic assumption, where $\gamma = C_p^{(g)}/C_v^{(g)}$ is the adiabatic gas constant, $C_p^{(g)}$ and $C_v^{(g)}$ v are the usual gas heat coefficients at constant pressure and density, respectively, and $\Delta P$ is the pressure drop at a certain point of the nozzle from its entrance. This can be approximated by $\Delta T \cong (\gamma-1)\gamma^{-1}\Delta P P_o^{-1} T_o$.

Assuming a slender fiber, its local temperature profile T1 is given by $$v_x T_1 = \alpha_r (r_r T_1)/r \quad (3)$$

with boundary conditions $T_1(x; f) = T_s$ ($T_1(x;0)$ ), and $T_1(0, r) = T_o$, where $T_s$ is the gas temperature at the fiber surface, r is the radial coordinate (made dimensionless with $\alpha$) and $\alpha = K/(v_1 \rho C_{p\alpha}^2)$. P, K and $C_{92}$ are the liquid density, thermal conductivity and heat capacity, respectively. We can distinguish two limiting problems:

1. $\alpha >> 1$: In this case, we can assume $T_1 = T_s$. We call this the "gas limited" (GL) case.
2. $\alpha << 1$: In this case, we can assume $T_1 = T_o$. We call this the "isothermal" (IT) limit.

In the GL case, the temperature profile of the fiber in the radial direction can be considered uniform, and the temperature is controlled by the ability of the gas to trans-port the heat through its thermal boundary layer. In the other limit, IT, the liquid bulk remains at the initial $T_o$ temperature because the inability of the liquid thermal boundary layer to evacuate the liquid heat.

From the point of view of the fiber shape homogeneity and quality, the GL case is the most interesting one, because it involves a controlled temperature (i.e., material quenching and enhanced amorphous structure) and a substantial increase in the fiber viscosity (and therefore an increase in its "mechanical resistance") as it proceeds towards the nozzle exit, which immediately suppresses most instabilities by itself without the need of a further refinement of the process, although it requires a limited production velocity, given by $V_1 << KL/\rho C_p \alpha^2)$. These velocities can be accomplished by the classical simple hot drawing process in some cases, but the temperature control is in this process severely limited.

On the contrary, the IT case is challenge because it is most unstable and difficult to control, but its reward is its large productivity (large E values). Because of this, we will focus on this particular limit, also considered by Yarin et al. (1999) in the case of simple drawing. We will show that the use of the co-flowing high speed gas stream provide the means to (i) completely stabilize the fiber, to (ii) yield fiber homogeneity and/or shape control, and to (iii) control fiber quenching. Although we are interested in the IT case, for the sake of generality in the following we will consider the temperature variations in the liquid for the GL limit also.

Gas boundary layer, viscous shear stress, and heat transfer on the fiber surface—The gas boundary layer on the liquid jet has a thickness of the order of $\delta \sim O((\mu_g L P_o^{-1})^{1/2} (R_g T_o)^{1/4})$, where $P_o$, $T_o$, and $\mu_g$ are the stagnation gas pressure and temperature at the nozzle entrance, and $^1$g is the gas viscosity, respectively, and $R_g = C_p^{(g)} - C_v^{(g)}$ as usual. The tangential viscous stress $\tau$ acting on the jet surface, owing to the much faster gas stream, is then of the order of $\tau \sim O((\mu_g L^{-1} P_o)^{1/2} (R_g T_o)^{1/4}$. Comparing the axial resultant viscous stress on the surface, $F_s$, of the order of $F_s \sim \tau/\alpha$, with the extensional (axial) resultant of the viscous stress, $F_v$, of the order of $F_v \sim \mu V_1/L_2$, and since $P_o \sim \mu V_1/L$, one obtains $$F_s = F_v \sim (\mu_g/\mu_1)^{1/2} (R_g T_o/V_1^2)^{1/4} L/\alpha \quad (4)$$

We seek for production velocities $V_1$ much larger than $\mu_g \mu^{-1} L^2 \alpha^{-2} R_g (T_o)^{1/2}$ (of the order of about $10^{-3}$ to $10^{-2}$ m/s in practical situations), for which $F_s << F_v$, and the contribution of the surface stress is negligible versus the axial component of the normal pressure stress, of the order of $P_o L^{-1} \sim \mu V_1 L^{-2}$. Thus, the momentum equation in (1) reduces to $_x \rho = \partial_x (\zeta f^2_x V)/f^2$.

Since the gas temperature variations can be approximated by equation (2), considering a portion of the threadline, its temperature variation owing to the heat transfer through the gas thermal boundary layer (of the order of $\delta$ since the gas Prandtl number is of the order 1) is of the order of $$\Delta T_l \sim \frac{L}{\rho C_p \alpha V_1} \kappa_o \frac{\Delta T}{\delta}$$

where $\kappa_o$ the gas thermal conductivity at temperature $T_o$. In practical situations, we may have $L(\rho C_p \alpha V^1)^{-1} \kappa_o \delta^{-1} << 1$; however, owing to the strong dependence of viscosity with temperature, these limited liquid temperature variations (about 5 to 20% of $T_o$ in practice) are sufficient to increase the liquid viscosity by orders of magnitude, which is a mechanism that suppresses most instabilities by itself.

It should be discussed here that owing to the high $P_o$ values needed to drive the fiber, the gas undergoes its maximum expansion and consequently its maximum cooling right after the nozzle exit. In the GL case, the fiber is sufficiently hardened to remain unaffected by this expansion. In the IT limit the nozzle exit geometry and the fiber winding system after the exit should be carefully designed to avoid fiber shape inhomogeneities.

Nozzle geometry—In order to reduce the problem of the nozzle geometry to a single parameter, without lost of generality on our aimed task, we have selected pressure distributions of the type:

$$\rho(x) = \rho_o e^{-\lambda x}$$

where $\lambda$ is a free parameter, and the set of parameters $\{\rho_o, \lambda\}$ will be optimized for the requirement of an unlimited fiber drawing (i.e. fiber production) with a minimum energy consumption (minimum $\rho_o$). Thus, given stagnation pressure $\rho_o$, we seek $\lambda$ values for which the drawing is absolutely stable for any (unlimited) given "productivity" E value.

Fiber stability. Suppression of the non-symmetric in-stability (fiber whipping)—Considering $\rho_o$ values of the order unity, for values of $\lambda < 0.635$, one obtains a sub-sonic gas flow along the nozzle, except at the nozzle exit. Calculating the pressure distribution on the fiber when it undergoes a small departure from the axisymmetric configuration (we recall that gas and liquid flows are uncoupled with time, and that the gas flow can be calculated in steady regime), one obtains a strong destabilizing effect. On the contrary, for $\lambda$ values sufficiently larger than 0.635, the resulting supersonic part of the nozzle flow provokes the reversal effect: any departure from the basic axisymmetric configuration provoke a strong re-aligning azimuthal pressure distribution, which suppress any possible incipient fiber whipping.

Thus, we will consider $\lambda > 1$ values only in our analysis.

Suppression of the "drawing resonance" axisymmetric instability. IT case—Consider the small perturbations problem given by $$F=f_e(1+\alpha e^{\Lambda T}), v=v_e(1+\beta e^{\Lambda t})$$

and governed by equations (1), where $f_e(x)$ and $v_e(x)$ are the steady values of the problem for the given boundary conditions, $\alpha(x)$ and $\beta(x)$ are complex functions with argument small compared to 1, and $\Lambda$ is the complex perturbation growth rate. Thus, $\alpha$ and $\beta$ are governed by a set of 2 complex ODEs with homogeneous boundary conditions that can be readily obtained from equations (1) (problem not written here for simplicity; see [1]), which determine the eigenvalue $\Lambda$, and whose real part $\Lambda_r$ gives the growth factor in time. We give the value $\Lambda_r$ as a function of $\rho_o$ for $\lambda=6$ and $E=120$.

For every given E and $\lambda$ values, there is a corresponding $\rho_o$ value above which any axisymmetric instabilities are suppressed. In FIG. 3A we plot the curves which divide the $\{E, \rho_o\}$ space into stable (above the curve) and unstable (below the curve) parametrical sub-spaces, for several $\lambda$ values of practical interest. One may immediately note from this plot that for every given $\lambda$ value, there is a particular limiting value of $\rho_o$ for stabilization above which the fiber is stable for any value of E>1. In FIG. 4, we plot these limiting $\rho_o$ values as a function of $\lambda$, and obtain a universal minimum value of the pressure above which the fiber is absolutely stable regardless the fiber productivity E.

A minimum limiting $\rho_o$ value about 0.33 around the point $\lambda \cong 5.65$ can be found, corresponding to the optimum nozzle shape with a significant supersonic region (from x=0:112 to x=1) for a single parameter geometry. In this case, given a desired fiber diameter a and fiber production velocity $V_1$, the minimum gas pressure $P_o$ necessary to have absolute stability is given by the simple expression:

$$P_o=\mu V_1/a \quad (8)$$

with a nozzle shape as shown in FIG. 2.

A practical case—Consider the production of 173 Km/day of a fiber with a diameter of 200 $\mu$m of an alumino-silicate glass ($\mu_o=10^3$ Pa ·s at $T_o=1500K$). The minimum pressure required is then $P_o=2\times10$ Mpa, with a nozzle exit pressure of $P_s=P_o\times e^{-5.65}\times 70.3$ Kpa. Assuming that the nozzle exits into an adapted pressure chamber, at a temperature $T_s=300$ K, the isentropic compression of the gas from the exit chamber (recirculation) rises the temperature to the required $T_o\sim1500K$. The liquid has density, thermal conductivity and heat capacity $\rho=3000$ Kg ·m$^{-3}$, K=1 J(m·s·K)$^{-1}$, and $C_\rho=1000$ m$^2$ (s$^2$·K), respectively. The nozzle design should minimize the neck-fiber gap with-out compromising stability. A feasible solution is a nozzle with a length of 10 mm, a neck diameter of 1.3 mm at 1.12 mm from the entrance, and exit diameter of 1.28 mm. Considering the presence of the fiber, this nozzle has a minimum (sonic) cross section area of 0.32 mm$^2$. Since $V_1=2$ m·s$^{-1}$>>KL/($\rho C_\rho a^2$)=0.3 m·s$^{-1}$, the fiber can be considered quasi-isothermal (IT limit). The minimum theoretical power consumption of the plant is then W=9.54 KW, with a gas flow rate of about 1 l/s at $P_s=0.7$ Bar. Scale-up is straightforward.

A further refinement of the nozzle geometry is possible introducing new geometrical parameters (the minimum $\rho_o$ value may be further optimized). This refinement does not limit the generality of the above analysis.

[1] A. L. Yarin, P. Gospodinov, O. Gottlieb, M. D. Graham, Phys. Fluids 11, 3201 (1999).

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, material, composition of matter, process, process step or steps, to the objective, spirit and scope of the present invention. All such modifications are intended to be within the scope of the claims appended hereto.

What is claimed is:

1. A method of producing a fiber from a molten viscous liquid; comprising the steps of:

extruding a stream of a molten viscous liquid in a manner so as to flow from a supply source into a pressure chamber wherein the stream has a first circumference;

supplying a focusing fluid to the pressure chamber whereby the fluid enters through an entrance port of the pressure chamber and exits through an exit port of the pressure chamber positioned downstream of the flow of the stream of molten viscous liquid;

wherein the focusing fluid surrounds the stream of molten viscous fluid and compresses the first circumference creating a narrowed stream of a second circumference narrower than the first circumference, which narrowed stream is expelled from the exit port of the pressure chamber as a fiber.

2. The method of claim 1, wherein the molten viscous liquid is molten silica glass.

3. The method of claim 2, wherein the focusing fluid is a gas.

4. The method of claim 3, wherein the gas is a heated inert gas.

5. The method of claim 2, wherein the gas exits the exit opening of the pressure chamber at supersonic speed.

* * * * *